Dec. 28, 1965    S. L. HALLERBÄCK    3,225,975
COOKING VESSELS WITH A POURING LIP
Filed Feb. 13, 1963    2 Sheets-Sheet 1

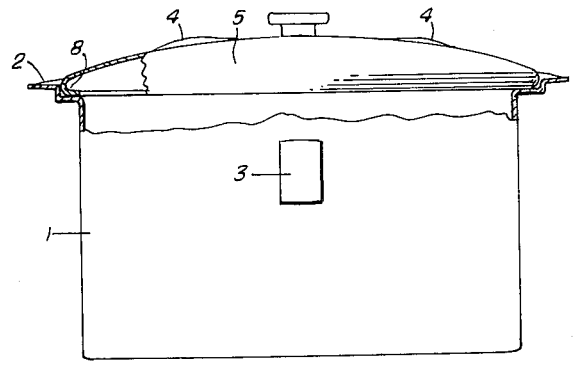
FIG.4
FIG.5
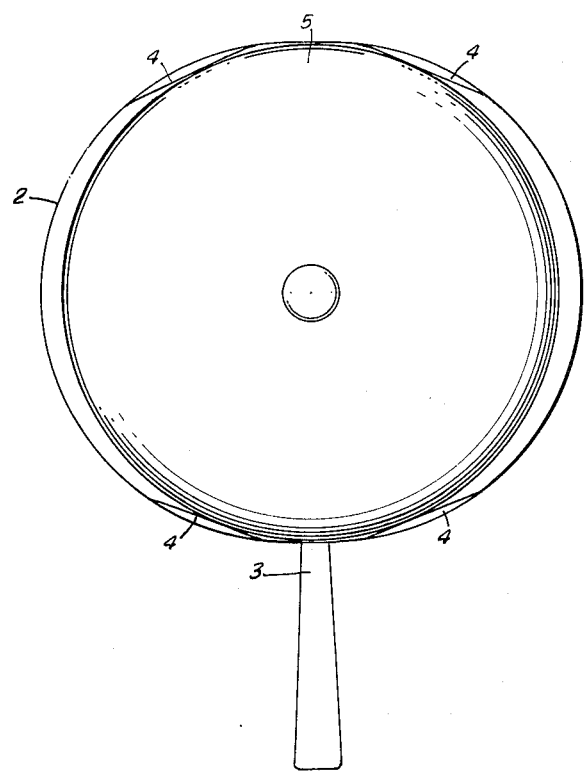

United States Patent Office 3,225,975
Patented Dec. 28, 1965

3,225,975
COOKING VESSELS WITH A POURING LIP
Stig Lennart Hallerbäck, Jarpstigen 6, Sodertalje, Sweden
Filed Feb. 13, 1963, Ser. No. 258,248
3 Claims. (Cl. 222—572)

This invention relates to cooking vessels having a lid and handle means, such as saucepans used for boiling potatoes, vegetables and other foodstuffs.

With the ordinary type of cooking vessels used for boiling potatoes, vegetables or other foodstuffs, the pouring off of the cooking liquid may be a precarious operation, as the hand which prevents the lid from being displaced when the vessel is tilted may be burnt by escaping steam or by an accidental contact with the hot metal.

It is the chief object of the present invention to provide a cooking vessel by which the cooking liquid may be poured off with the lid automatically kept in a position apt to prevent the solids in the vessel to escape together with the poured-off liquid.

This and other objects, advantages and features of the invention will become more fully apparent as reference is had to the accompanying specification and drawings wherein:

FIG. 4 is a sectional elevation of a saucepan with a lid, according to a modified embodiment.

FIG. 5 is a top plan view of the saucepan illustrated in FIG. 4.

Figure 1:
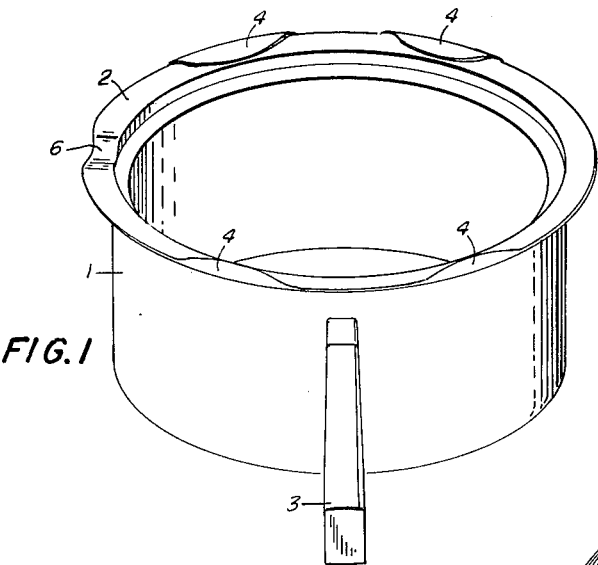
FIG. 1 is a perspective view of a saucepan incorporating the invention, the lid being omitted.

The saucepan 1 illustrated in FIG. 1 has a straight, radially extending handle 3 and an ellipse-shaped flared-out top brim 2. The minor axis of the ellipse is parallel to the handle axis, and the flared-out edge may be lacking, or may project only very slightly beyond the saucepan side wall at those parts of the latter where the ellipse minor axis ends.

At either side of the ellipse minor axis the flared-out edge portions are bent upwards and backwards to form lugs or tongues 4, and these lugs or tongues are so shaped and dimensioned that they do not interfere with the putting on or taking off the saucepan lid 5 (FIGS. 2, 4, and 5), provided that the lid is put on or lifted off straight and centrically. If, however, the saucepan 1 is tilted beyond a certain extent, with its handle 3 acting as a pivot, in order to pour off the liquid or part thereof from the solid goods, such as potatoes, vegetables or other foodstuffs the lid 5 will slide down until caught by the lugs 4 on the downward side, the rim of the lid being engaged between the saucepan brim 2 and the overlying "flange" portion of the lugs 4, the "web" portion of the lugs serving as end stops.

Consequently, the lid is securely held, even if the saucepan is tilted more than 90°, and no supplemental measures, such as assistance with the other hand, are needed.

Figure 2:
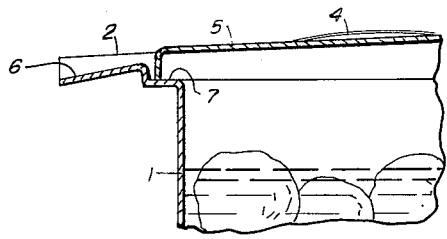
FIG. 2 is a partial sectional elevation of a saucepan with a lid.
Figure 3:
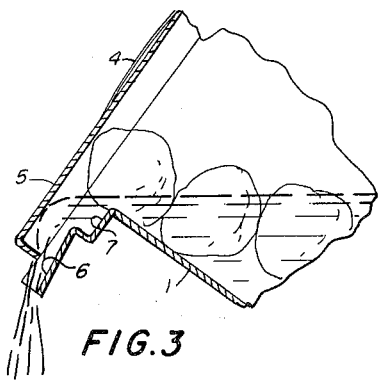
FIG. 3 is a partial sectional elevation of the saucepan in FIG. 2 when tilted for pouring off liquid.

To facilitate pouring, preferably a spout or pouring lip 6 is formed in the flared-out rim 2 (FIGS. 2 and 3). Further, the rim 2 may preferably be shaped with a concentric circular or part-circular shoulder 7 which serves as a guide for the lid (FIG. 2), but does not prevent the latter from sliding down and engaging the lugs 4 when the saucepan is tilted as described above (FIG. 3). For that reason, the shoulder should not have a high lateral wall, and the latter should be smoothly rounded to facilitate the sliding down movement of the lid upon the tilting of the saucepan. The shoulder also is advantageous in that it serves to collect and lead back condensed steam.

Figure 6:
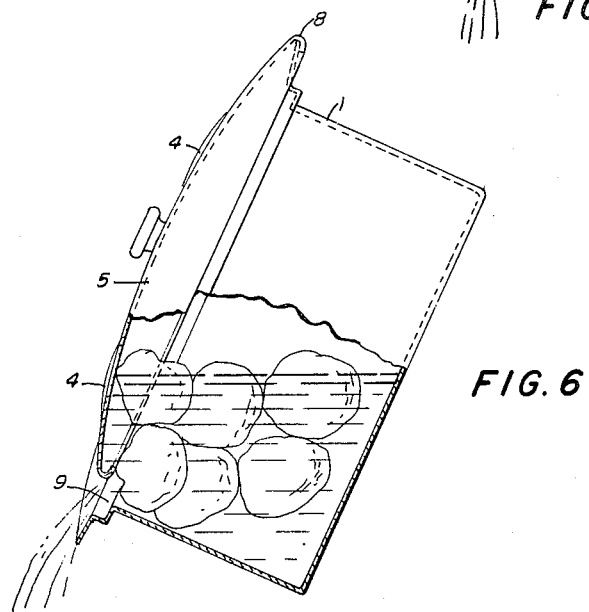
FIG. 6 is the boiling vessel illustrated in FIG. 4 in a tilted position, the FIGURE showing the modified arrangement for retaining the lid and of the pouring spout.

In a modified embodiment (FIGS. 4 to 6) the depending skirt 8 of the lid 5 is turned slightly inwards, and before the saucepan is tilted to a pouring position, the lid is first moved a little backwards to make its skirt engage over the saucepan rim (FIG. 6). The latter being elliptically shaped, as illustrated in FIG. 5, its radius of curvature at the portion to be engaged by the lid skirt is smaller than the radius of curvature of the skirt, and that difference makes the engagement between the saucepan rim and the lid possible well as the engagement between the two far-side lugs 4 and the lid. No spout is provided in this embodiment, as the lid is moved back, and leaves free an aperture 9 between the saucepan wall and the lid which will serve for draining off the liquid upon tilting the saucepan, as illustrated on FIG. 6.

In the drawings, saucepans having one handle have been illustrated as examples. The invention may also be embodied in vessels having two handles, as known in themselves. Although two holding lugs may be a sufficient number in some cases, four holding lugs is preferable, as the arrangement may then be a completely symmetrical one. Even more lugs than four may be provided. Although it would be advantageous to form the brim 2 integral with the vessel, it might also be formed as a separate part and joined to the vessel by any known means.

What I claim is:

1. A cooking vessel particularly a saucepan comprising a body having a closed lower end, side wall defining means and an upper open end, handle means attached to the body and a separate lid, said body being provided at said open upper end with a flared-out annular rim with an elliptic circumference, said rim being formed with a shallow stepped portion adapted to guide said lid concentrically of the body, at least one pair of holding lug means formed integrally with said rim and disposed beyond the outer circumference of said lid when guided by said stepped rim portion, and said holding lug means being adapted to engage and retain the lid when displaced sideways in tilted positions of the body but providing no obstructions to the removal and placement of the lid in a normal fashion.

2. The cooking vessel as claimed in claim 1 including pouring lip means formed in the flared-out rim of the body.

3. The cooking vessel as claimed in claim 1 in which said lid is provided with a circular depending skirt, with said skirt being formed with an inturned bottom edge.

References Cited by the Examiner

UNITED STATES PATENTS

| 143,116 | 9/1873 | Bates | 220—55 X |
| 1,408,410 | 2/1922 | Sidle | 222—572 X |
| 2,214,623 | 9/1940 | Millen | 220—55 X |

FOREIGN PATENTS

| 954,161 | 6/1949 | France. |
| 98,879 | 11/1895 | Germany. |
| 631,319 | 6/1936 | Germany. |
| 279,706 | 11/1927 | Great Britain. |

M. HENSON WOOD, JR., *Primary Examiner.*

LOUIS J. DEMBO, *Examiner.*